United States Patent [19]
Klopsch

[11] 4,189,741
[45] Feb. 19, 1980

[54] APPARATUS FOR IMPROVED COLOR JUDGEMENT IN A COLOR MONITOR FOR ELECTRICAL COLOR CORRECTION

[75] Inventor: Siegfried Klopsch, Probsteierhagen, Fed. Rep. of Germany

[73] Assignee: Dr. Ing. Rudolf Hell GmbH, Fed. Rep. of Germany

[21] Appl. No.: 898,487

[22] Filed: Apr. 20, 1978

[30] Foreign Application Priority Data

May 4, 1977 [DE] Fed. Rep. of Germany ....... 2719821

[51] Int. Cl.² ............................................. G03F 3/10
[52] U.S. Cl. ......................................... 358/76; 358/80
[58] Field of Search ................................. 358/76, 80

[56] References Cited

U.S. PATENT DOCUMENTS

| | | | |
|---|---|---|---|
| 3,441,663 | 4/1969 | Dreyfoos, Jr. et al. | 358/76 |
| 3,848,856 | 11/1974 | Reeber et al. | 358/76 |
| 3,972,066 | 7/1976 | Seki et al. | 358/76 |
| 4,037,249 | 7/1977 | Pugsley | 358/76 |
| 4,096,523 | 6/1978 | Belmares-Sarabia et al. | 358/80 |

*Primary Examiner*—Richard Murray
*Attorney, Agent, or Firm*—Hill, Van Santen, Steadman, Chiara & Simpson

[57] ABSTRACT

In a device for producing corrected color chromatic components for multicoloring printing in which an original is scanned and recorded and selectively displayed on a television monitor in which a switching arrangement is provided for producing an one-color frame which surrounds the color picture on the picture screen so as to allow improved color corrections to be made.

4 Claims, 3 Drawing Figures

APPARATUS FOR IMPROVED COLOR JUDGEMENT IN A COLOR MONITOR FOR ELECTRICAL COLOR CORRECTION

BACKGROUND OF THE INVENTION

1. Field of the Invention

The present invention relates to means for making improved color corrections.

2. Description of the Prior Art

U.S. Pat. No. 3,848,856 describes an apparatus in which a raster scan scans a color image, for example, a color slide or finished color extraction and supplies a set of color component signals which are subjected to an electronic color correction and then supplied to a video display receiver for observation and control. The color component signals represent the color dosage values for the individual print colors magenta, cyan, yellow and black and are to be corrected with an apparatus having a level indicator under viewing control. So that color images will also be formed on the video receiver, the impression is produced by an image printed with the corrected color component signals with the aid of the corresponding color extractions and a print simulating stage is provided between the correction stage and the video receiver which takes into consideration the fixed parameters of the respective printing process for display. In the color monitor the corrected color picture is displayed in order to control the color correction i.e. the judgement of the correction and the adjusting of the color correction stage. In the published German Patent Application No. 1924309 a method and an apparatus for controlling the mixture of colors during a reproduction process are disclosed, wherein representative gray values of the finished color separations are measured in order to determine the dosage of the color inks during the printing process (page 2, last paragraph and page 3, paragraph 1 of the published German Patent Application). On page 3, paragraph 2 and in claim 1 is further disclosed, that after photoelectrically measuring the corrected color separations, magenta, yellow and cyan the currents of the photocells are fed via amplifiers to electromechanically driven devices for shifting illuminated foil strips bearing color wedge filters representing the full shading range of the separated colors.

These movable wedge filters are arranged beyond a control field which is surrounded by a white environment which has the same white as the white of the foil strips in order to achieve that a small variation of the color value which differs from the environment is recognised.

The environment of the control field can also be colored, but in this case the color should be the same as the color in which the measured picture point of the color separation shall appear after printing.

The method of the published German Patent Application allows the match the density range of the corrected color separations to the density range of the used printing process. The environment of the control field serves to gauge the white level or another color level of the printing process without having an influence of the whole density range of the separations during color correction. In the apparatus according to the U.S. Pat. No. 3,848,856 this procedure is performed by a special print simulating stage which is arranged between the color correction stage and the monitor. This print simulating stage may be programmed e.g. by the parameters obtained by the measuring method of the published German patent application. The problem of my present invention is not to gauge this print simulating stage according to special elected picture points, but to make an improved color correction with respect of the entire impression of the whole picture.

SUMMARY OF THE INVENTION

The primary object of this invention is to provide a device for improved color evaluation and adjustment in a color monitor.

A switching arrangement allows an one-color frame to surround the color picture on the picture screen of a monitor.

The human eye adjusts to the same reference color and errors do not occur because of this adjustment of the eye.

It is desirable to provide that the color of the one color frame be that of the paper on which the picture is to be printed, although other colors could be used. The print is optimally simulated because the print colors and the corrected densitiy values of the picture are taken into consideration by the print reproducing computer.

If a picture original does not contain any white points, a frame reproducing the white paper can be focussed in so that the eye can find a white reference.

The frame can be adjusted in size to various widths by focussing.

Other subjects, features and advantages of the invention will be readily apparent from the following description of certain preferred embodiments thereof taken in conjunction with the accompamying drawings although variations and modifications may be effected without departing from the spirit and scope of the novel concepts of the disclosure and in which:

DESCRIPTION OF THE PREFERRED EMBODIMENTS

Figure 1:
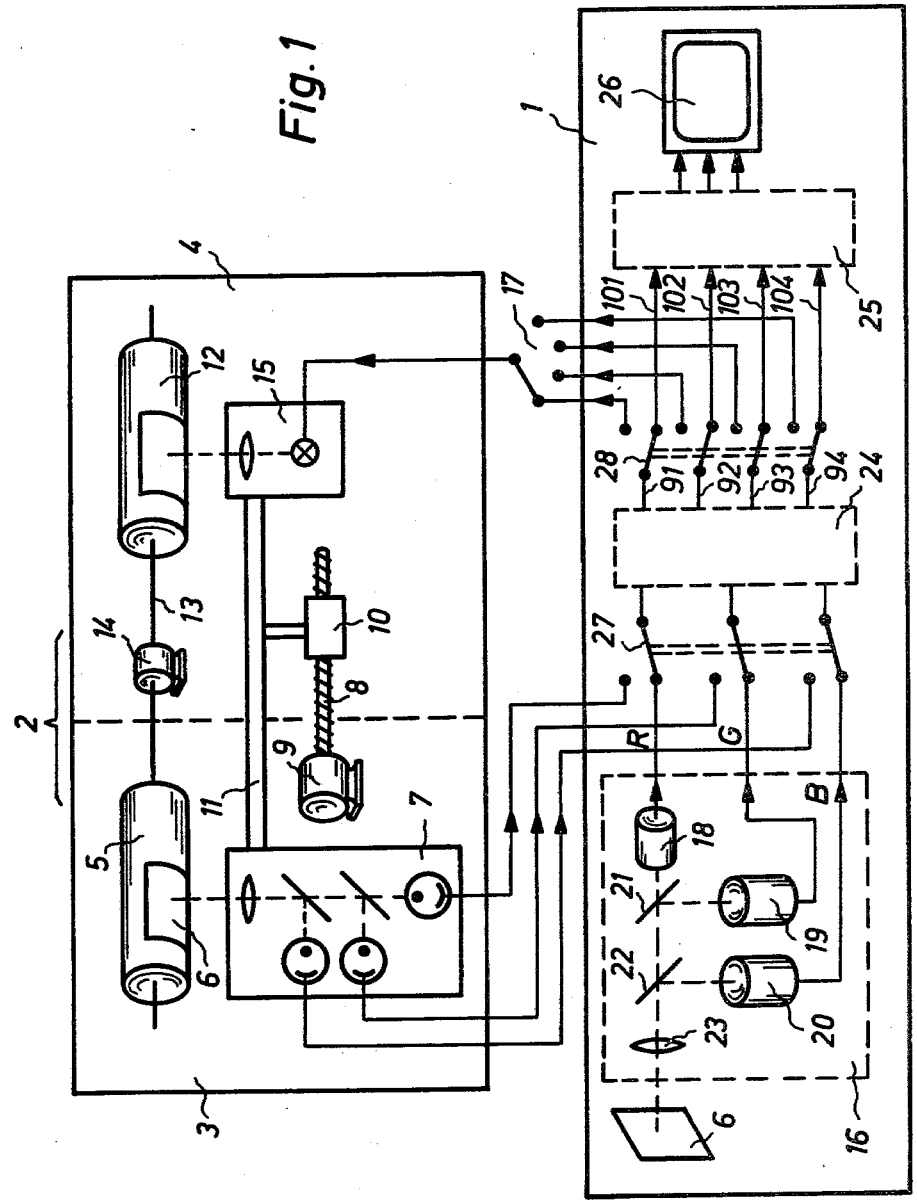
FIG. 1 is a circuit diagram illustrating the invention including a monitor set-up for color correction.

FIG. 1 illustrates a color correction means 1 connected to a machine for producing the individual color extractions 2. Machine 2 includes a scanning unit 3 and a recording unit 4. The scanning unit consists of a scanning drum 5 upon which the original 6 is mounted which is scanned line by line by scanning head 7 which is axially moved along side of the drum 5 by means of suitable bars, a nut 10 and a threaded mandrel 8 which is driven by a motor 9. The motor through means of the spindle nut 10 and bar 11 moves the scanning head 7 back and forth line by line across the original 6 in a well known manner.

The recording unit 4 also consists of a recording drum 12 mounted on a common shaft 13 with the scanning drum 5 and both the drums 5 and 12 are driven by a motor 14. A recording head 15 is mounted to move with the scanning head 7 and is supported on the bar 11 so that it records line by line as the motor 9 causes the scanning and recording heads 7 and 15 to move back and forth relative to the drums 5 and 12.

Before the production of color extraction starts, the color corrections is accomplished in the color correction means 1. A previously known television camera unit 16 is provided which scans the original 6. For this purpose, the original 6 is mounted adjacent to the television camera unit 16 as shown in FIG. 1 before being mounted on the drum 5. With the use of the camera tubes 18, 19 and 20, the image of the original is scanned line by line using reflector divider mirrors 21 and 22 and an optical system 23. This allows the spectral sensitivity curves of the three color channels of the color camera to be obtained such that they agree with the channels of the scanning unit 3. Thus, known television scanning of still pictures is used, where the optical objective 23 is preferably a zoom-objective lense. The electrical color measuring value signals R, G, and B (red, green and blue) obtained by the camera tubes are supplied to a color computer 24 from which they are supplied to a color transposer or translator 25 which energizes a monitor 26. Between these modules arrows indicate the direction of signal flow. My copending application Ser. No. 770,192, filed Feb. 18, 1977 is hereby incorporated by reference for certain details described therein.

FIG. 1 and the description associated therewith does not illustrate the pulse control for the camera and monitor as such controls are well known to those skilled in the art and are not necessary for an understanding of the present invention. In a practical embodiment for example, a commercial studio camera and a commercial color monitor can be used.

Details of pulse control and raster production, for example, are discussed in the text book Television Technique, vol. 2 by H. Schonfelder, published by Justus von Liebig, Darmstadt, Chapter 10, Impulse Technique, pages 10/1 through 10/5 and Chapter 11, Deflection Technique, pages 11/1 through 11/26. Such pulse control and raster production are also accomplished in standard commercial television sets and are well known to those skilled in the art.

Figure 2:
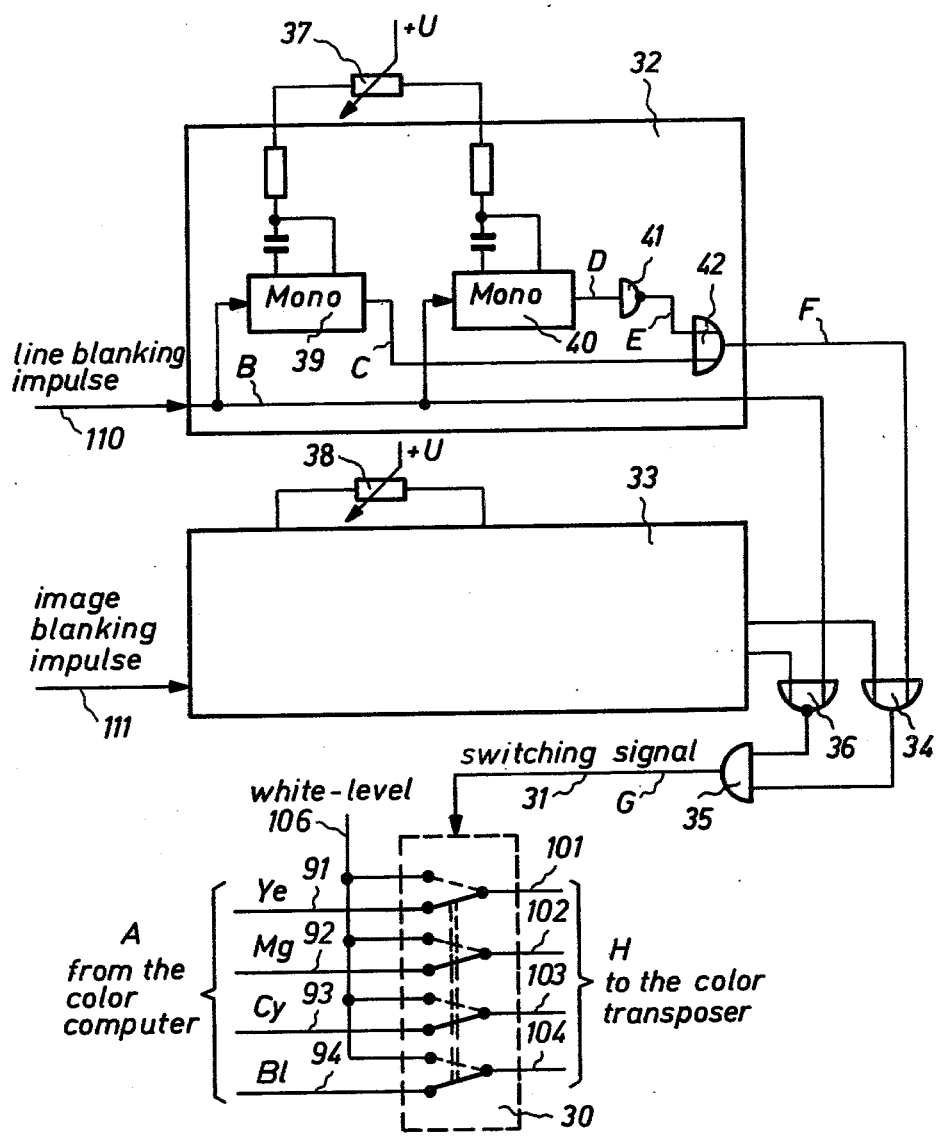
FIG. 2 is a circuit diagram of the circuit for providing the color frame.

FIG. 2 is a circuit for adjustment of the frame. The circuit is designed for receiving picture, blanking and line blanking pulses which are present in every commercial television apparatus or televisions systems. So as to adjust focus and fade in the white value into the color signal control a switch 30 not illustrated in FIG. 1 but illustrated in detail in FIG. 2 and which would be mounted between the color computer 24 and the color transposer 25 is provided as shown. The color component signals yellow, magenta, cyan and black which occur on leads 91 through 94 at the output of the color computer 24 supply inputs to contacts of the switch 30 and supply when connected outputs to the leads 101 through 104 which supply the color inuts to the color transposer 25 illustrated in FIG. 1. The switch 30 allows the output of the color computer 24 or alternatively a white level signal which appears on lead 106 to be supplied to the color transposer 25 on leads 101 through 104. The white level is a constant signal which can be supplied to the input of the color monitor through the color transposer 25. The switch 30 is advantageously designed as a rapid electronic multiple switch actuated via a switch line 31. The semiconductor switch of the type AD7512 DIKD Analog Devices for example can be utilized. An individual module respectivly contains two switches can be actuated in TTL fashion. Thus, in the present case two modules could be utilized. The switch impulse in line 31 for the throw-over switch 30 either comes from a logic block 32 or from a logic block 33.

The OR linkage necessary for supplying the impulses is furnished by the OR gates 34 and 36 through an AND gate 35. The AND gate 35 and inverting OR gate 36 assures the frame is switched off during the picture scanning.

The gate 35 serves as a safe guard gate.

The logic block circuits 32 and 33 are constructed of the same components and function in a similar manner. The frame width in line direction can be adjusted with a potentiometer 37. The frame width vertically to line direction can be adjusted with a potentiometer 38. The adjustment ranges of the potentiometers are selected such that the frame width is zero at the left stop, in other words, the frame disappears and at the right stop the frame sides meet in the center of the picture, in other words, the total picture information is covered by the frame.

Figure 3:
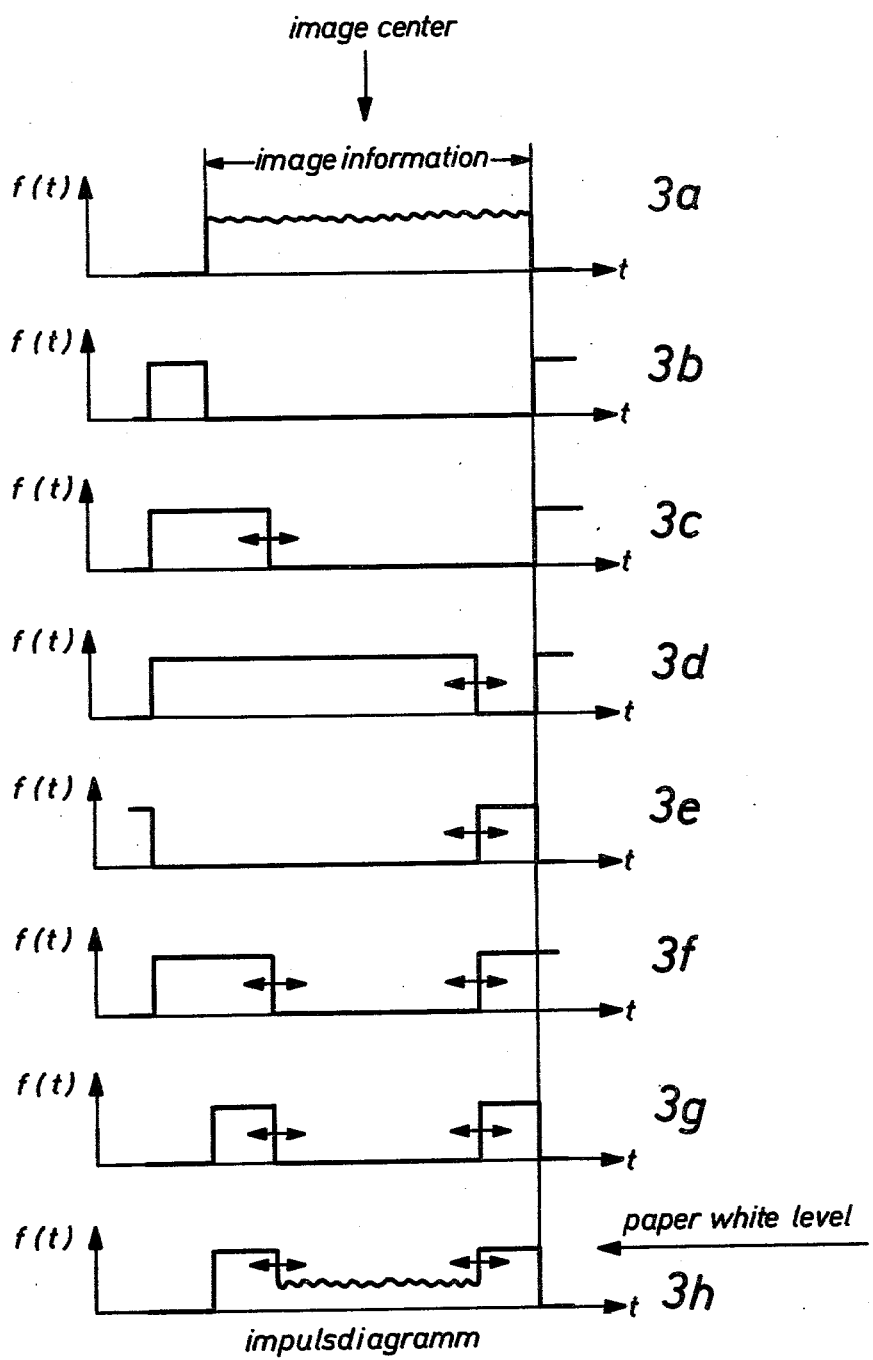
FIGS. 3a–3h illustrate wave forms in the inventions.

The function of the blocks 32 and 33 is more detailly explained with the use of FIGS. 2 and 3. The positive flank of the line blanking impulse 110 illustrated in FIG. 3b starts up a mono-stable flip-flop 39 and a mono-stable flip-flop 40. The double module SN74129 DUAL Monoflop constructed by Texas Instruments can be utilized for the flip-flops 39 and 40. Transit time regulators for the mono-stable flip-flops 39 and 40 are additionally provided which are selected such that the flip-flop 39 is always reset earlier than the flip-flop 40. The impulse diagrams of FIG. 3 illustrate the two impulses for specifically setting of the impedance 37 in FIGS. 3c and 3d. If the impulse of FIG. 3d is inverted by way of gate 41 so that it has the shape of the pulse illustrated in FIG. 3e and if the impulses illustrated in FIG. 3e and FIG. 3c are combined by way of an OR gate 42 the mixed impulses according to FIG. 3f will be obtained. The gate 41 provides the inverter for the signal shown in FIG. 3d so that its output corresponds to the impulse illustrated in FIG. 3e. If the impulse shown in FIG. 3f is additionally combined with the line blanking impulse illustrated in FIG. 3b by way of gates 34 and 36 the switch signal shown in FIG. 3g is obtained on lead 31.

The signal illustrated in FIG. 3a represents the input signal to the switch 30 and the signal illustrated in FIG. 3h illustrates the output signal of the switch 30.

It is to be realized, of course, that the electronic switch 30 must switch back and forth very rapidly so as to obtain a sharp transit from frame to picture.

The potentiometers 37 and 38 allow the specific settings of the outputs of the circuits 32 and 33 to be varied as desired.

Although the invention has been described with respect to preferred embodiments, it is not to be so limited as changes and modifications may be made therein which are within the full intended scope of the invention as defined by the appended claims.

I claim as my invention:

1. Apparatus for improved color evaluation in a color monitor for reproduction of color prints for making color corrections, whereby the color picture is visible on said monitor, comprising a switching arrangement connected to said monitor in order to produce a one color frame border which surrounds the color picture on the picture screen by supplying reference color frame signals to said monitor and including means for varying the color of said one color frame border.

2. Apparatus according to claim 1 wherein the color of the frame can be adjusted to a desired color value corresponding with the color of the unprinted paper.

3. Apparatus according to claim 2 wherein means for adjusting the width of the frame are provided.

4. Apparatus for improved color evaluation in a color monitor for reproduction of color prints for making color corrections, whereby the color picture is visible on said monitor, comprising a switching arrangement connected to said monitor in order to produce a one-color frame which surrounds the color picture on the picture screen by supplying reference color frame signals to said monitor, wherein the color of the frame can be adjusted to a desired color value corresponding with the color of the unprinted paper, wherein means for adjusting the width of the frame are provided and wherein said means for supplying reference color frame signals comprises two pairs of mono-stable flip-flops (39, 40) connected to the picture-or-line blanking impulse, respectively, for the line-and image blanking of the monitor, said flip-flops reset and adjustable with transit time regulators, the reset impulses of the first pair of flip-flops are switched as switch signal with an OR linkage 42 through an additional OR gate 34 which is also connected to the corresponding OR stage of the other pair of flip-flops, the picture and line blanking impulses together with the output of the OR gate 34 are switched through an AND gate 35 via an inverting OR gate 36, said AND gate 35 connected to an electronic switch 30 which controls said switching arrangement and by means of which the color signals which control the monitor can be cut off, and constant voltage sources which are switched on for the color information of the frame.

* * * * *